April 15, 1924.  
W. E. HOKE  
1,490,391  
APPARATUS FOR AND METHOD OF LAPPING SIMILAR ARTICLES  
Filed April 27, 1921
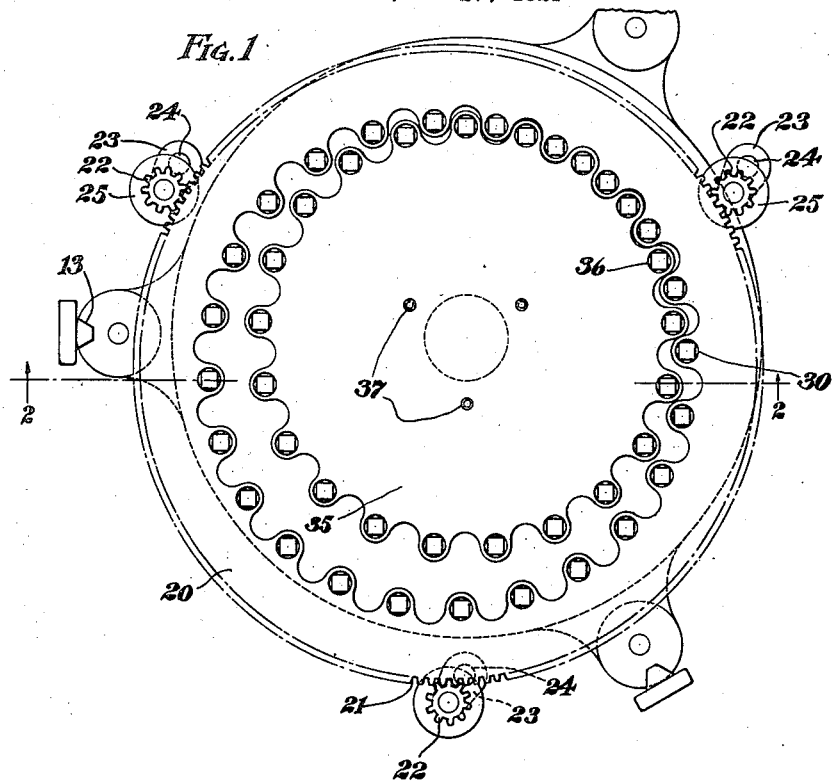
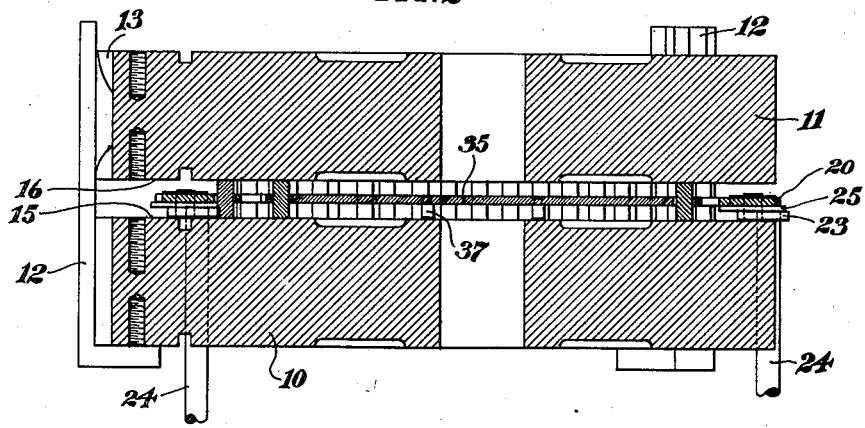
Inventor  
Wm. E. Hoke,  
By Joseph K. Schofield  
Attorney Patented Apr. 15, 1924.

1,490,391

UNITED STATES PATENT OFFICE.

WILLIAM E. HOKE, OF ST. LOUIS, MISSOURI, ASSIGNOR TO PRATT & WHITNEY COMPANY, OF NEW YORK, N. Y., A CORPORATION OF NEW JERSEY.

APPARATUS FOR AND METHOD OF LAPPING SIMILAR ARTICLES.

Application filed April 27, 1921. Serial No. 464,791.

*To all whom it may concern:*

Be it known that I, WILLIAM E. HOKE, a citizen of the United States, residing at St. Louis, in the State of Missouri, have invented certain new and useful Improvements in Apparatus for and Methods of Lapping Similar Articles, of which the following is a specification.

This invention relates to an apparatus for and method of grinding similar articles so that they may be simultaneously finished to a predetermined definite and precise dimension. More particularly this invention relates to an apparatus for and method of grinding a plurality of similar precision gages having opposite plane parallel end faces at predetermined identical distances apart.

An object of the present invention is to provide an improved apparatus for and a method of grinding or lapping a plurality of similar articles arranged in two symmetrical groups, so that the articles, such as precision gages, may be simultaneously ground to predetermined identical dimensions and be provided with opposite plane parallel end faces.

I accomplish the above objects of the invention by grouping the gages, or other articles, to be ground in two groups or rings, one within the other each group or ring containing a plurality, preferably twelve or more, of the articles to be ground.

The outer group of articles is mounted concentric with a spider which is directly moved relative to the surfaces of the laps by suitable actuating means. The inner group of articles is mounted in an independent spider suitably supported within the first, or outer, spider. To provide means for moving the inner group relative to the outer group, I preferably provide serrations, or teeth, on the contacting surfaces of the inner and outer spiders. These, in connection with the movements imparted to the outer spider, urge the inner spider to rotate relative to the outer spider so that the relative disposition of the inner and outer group of articles is constantly and automatically being changed.

One feature which enables me to make similar articles having opposite plane parallel faces at predetermined identical distances apart is that the articles to be made having their end faces so formed are arranged as above described and are disposed and operated between plane surfaced laps, one of the laps being adjustable as to parallelism relative to the other.

The invention is preferably carried out in an apparatus having two spiders, or carriers, in which the articles to be ground are mounted. Each of these spiders, in the embodiment of the invention selected for illustration, has a single ring or group of openings equally spaced from each other and equally spaced about the center of the spider. Within each of these openings or orifices in the spiders, one of the articles to be ground is located, the opening being such that the article may be free to rotate about its individual center or axis.

In order to accomplish the necessary operative movements between the groups of articles and the laps, I preferably provide the outer periphery of the spider or carrier with gear teeth, extending entirely around its periphery which are in engagement with small pinions suitably mounted at the ends of short cranks which may be rotated by any suitable means. Preferably three of these cranks and pinions are provided, all of which rotate in synchronism so that the outer spider is given a curved movement back and forth between the laps and also simultaneously given a precessional movement about its own center. The particular mechanism for producing the lapping movements between the articles and laps forms no part of the present invention and any mechanism adapted to give the articles the necessary lapping movements relative to the laps may be substituted for the mechanism shown.

As the inner spider is smaller than the outer one and has fewer serrations, the effect of the lapping movements imparted to the outer spider will be to force the inner spider to rotate with it. Also the inner spider will be given a slight precessional or advancing movement rotatively relative to the outer spider. In this way a continuous progressive interchange takes place between the two groups of articles while both groups of articles partake of the reciprocatory lapping movements imparted to the outer spider.

With the above and other objects in view, my invention consists in the features of construction and operation set forth in the following specification and illustrated in the accompanying drawing.

In the accompanying drawing annexed hereto and forming a part of this specification, I have shown my invention embodied in a gage grinding or lapping machine but it will be understood that the invention can be otherwise embodied and that the drawing is not to be construed as defining or limiting the scope of the invention, the claims appended to this specification being relied upon for that purpose.

In the drawing:

Figure 1 is a plan view of an apparatus for carrying out the present invention, the upper lap being removed.

Fig. 2 is a vertical sectional view of the apparatus taken on line 2—2 of Fig. 1.

In the above mentioned drawing, I have shown but one modification of the invention which is now deemed preferable, but it is to be understood that changes and modifications may be made within the scope of the appended claims without departing from the spirit of the invention.

Briefly, my invention in its broadest aspect comprises the following principal elements; first, a lower lap mounted rigidly in position or forming the base of a lapping machine or device; second, a lap positioned above the first lap and adapted to be held from rotation, but arranged so that it may rest on and adjust itself relative to the articles being ground; third, an outer spider having a plurality of openings preferably at equal distances from each other and disposed symmetrically about its center; fourth, a second spider within said first spider also arranged to retain individual articles to be ground in a symmetrical group; fifth, actuating means for reciprocating and rotating the outer spider to produce lapping movements between the articles and laps; and sixth, means between the first and second spiders so that the second spider is permitted to rotate relative to the first but partakes of the reciprocatory movements of the first spider.

The present invention is a modification, or improvement of the invention shown in my copending applications, namely, Serial No. 242,482 filed June 28, 1918, and Serial No. 458,280½, filed April 4, 1921, to which reference may be had for a further description of the lapping machine.

Referring more in detail to the figures of the drawing, at 10 is shown a lower lap adapted to be mounted on a suitable support and normally held from rotation thereon. At 11 is shown an upper lap mounted in cooperating position directly above the lower lap 10. Guides 12 secured to the lower lap extend through suitable guideways 13 provided on the upper lap so that the upper lap 11 is held from rotation relative to the lower lap 10 but is free to adjust itself as to parallelism with the lower lap and relatively to the articles being ground. The adjacent surfaces 15 and 16 of the laps 10 and 11 are suitably charged with an abrasive compound. Disposed between the adjacent surfaces of the laps 10 and 11 is an outer spider 20. This, preferably, is provided with gear teeth 21 on its periphery engaging pinions 22 mounted at the end of short cranks 23 which are suitably fastened to shafts 24. Preferably, three of these pinions 22 are provided. Rotation of the shafts 24 rotates the cranks 23 and the pinions 22 secured thereon, thus giving the outer spider 20 a reciprocatory movement due to the crank action and also a slow precessional movement about its own center due to the engagement of the teeth 21 with the pinions 22. Suitable supports 25 are mounted below the cranks 23 to support the spider 20 in place approximately midway between the adjacent surfaces 15 and 16 of the laps 10 and 11. Arranged about the outer spider 20, preferably in a circle, are orifices 30 large enough to loosely retain one of the articles to be lapped.

Within the outer spider 20 is another spider member 35 which has another group or circle of orifices 36 of the same size as the orifices 30, in these latter orifices another group of articles to be lapped may be mounted.

Preferably, the outer periphery of the spider 35 and the inner surface of the outer spider 20 are serrated or provided with gear teeth. These, as shown in the drawing, may be formed of circular arcs of sufficient diameter to provide ample room for the orifices 20 and 36 in each tooth or serration.

To support the inner spider 35 in place within the outer spider 20 struts 37 may be provided suitably fastened to the lower surface of spider 35 and adapted to rest on the upper surface of lap 10.

It will be seen from the above construction that when the outer spider 20 is reciprocated and slowly rotated, the inner spider 35 will also be reciprocated and rotated by reason of the fact that one side of the inner spider 35 will always have its teeth in engagement with some of those in the outer spider 20. The effect of this is to continuously rotate the inner spider 35 relative to the outer spider 20 as well as to reciprocate the inner spider. As the number of serrations or teeth 36 in the inner spider 35 is less than the number in the outer spider 20, the effect will be that the teeth on the inner spider 35 will mesh with different teeth on the outer spider at each revolution. The creep of the inner spider 20 relative to the outer spider is proportional to the difference in number of serrations or teeth between the inner and outer spiders. This arrangement, therefore, constantly changes the disposition of the articles to be lapped relative to each other and irregularities in their individual heights are constantly being redistributed relatively to each other. This has the effect of varying or interchanging the blocks continuously and automatically and avoids the necessity of manually transposing the blocks to get a very high degree of identity between the articles being lapped. The construction above described, however, is adapted to permit manual interchanging if that is thought desirable, either by interchanging the relative positions of the articles within their own groups or rings or transposing the blocks between the inner or outer rings.

With orifices such as 30 and 36 provided in each serration or tooth of the inner and outer spiders, the articles being lapped pass more closely over identical parts of the lapping surfaces so that the lapping effect on the inner group of articles is the same as that on the outer ring and thus avoids any inaccuracies in the dimensions of the articles caused by the different sections of the laps passed over by the inner block being more irregular or inaccurate than those passed over by the outer group of blocks.

What I claim is:

1. The method of making articles having opposite plane parallel end faces, which comprises grouping said articles in two symmetrical groups, one within the other, said groups being movable relative to the other, and operating said articles while contained in said groups between and in contact with adjacent plane surfaces of a pair of laps.

2. The method of making articles having opposite plane parallel end faces, which comprises grouping said articles in two symmetrical groups, one within the other, and continuously and uniformly moving said groups relative to the other while operating said articles contained in said groups between and in contact with adjacent plane surfaces of a pair of laps.

3. The method of making articles having opposite plane parallel end faces, which comprises grouping said articles in two symmetrical groups, one within the other, said groups being movable relative to the other, operating said articles while contained in said groups between and in contact with adjacent plane surfaces of a pair of laps, and continuously rotating one group relative to the other during operation.

4. The method of making articles having opposite plane parallel end faces, which comprises grouping said articles in two circular groups, one within the other, said groups being movable relative to the other, reciprocating and rotating said articles while contained in said groups between and in contact with adjacent plane surfaces of a pair of laps, and simultaneously rotating one group at a different rate than the other.

5. An apparatus for making similar articles having opposite plane parallel end faces, comprising in combination, a pair of laps having adjacent plane lapping surfaces adapted to contact with the articles being ground, a spider adapted to operate therebetween, said spider having a plurality of articles symmetrically grouped therein, and a second spider within the first spider movable relatively thereto, said second spider also having a plurality of articles symmetrically grouped therein.

6. An apparatus for making similar articles having opposite plane parallel end faces comprising in combination, a pair of laps having adjacent plane lapping surfaces adapted to contact with the articles being ground, a spider adapted to operate therebetween, said spider having a plurality of articles symmetrically grouped therein, a second spider within the first spider and movable relatively thereto, said second spider also having a plurality of articles symmetrically grouped therein, and connections between said spiders whereby said inner spider is rotated relative to the outer spider.

7. An apparatus for making similar articles having opposite plane parallel end faces, comprising in combination, a pair of laps having adjacent plane lapping surfaces adapted to contact with the articles being ground, a spider adapted to reciprocate and rotate therebetween, said spider having a plurality of articles symmetrically grouped therein, a second spider within the first spider and rotatable relatively thereto, said second spider also having a plurality of articles symmetrically grouped therein, and means to rotate said inner spider at a different rate than the outer spider.

8. An apparatus for making similar articles having opposite plane parallel end faces comprising in combination, a pair of laps having adjacent plane lapping surfaces adapted to contact with the articles being ground, a spider adapted to reciprocate and rotate therebetween, said spider having a plurality of articles symmetrically grouped therein, and a second spider within the first spider having a plurality of articles symmetrically grouped therein adapted to intermesh with said first spider whereby the reciprocatory and rotary movements of said outer spider rotate said inner spider relative to the outer spider.

9. An apparatus for making similar articles having opposite plane parallel end faces, comprising in combination, a pair of laps having adjacent plane lapping surfaces adapted to contact with the articles being ground, a spider adapted to reciprocate and rotate therebetween, a plurality of articles symmetrically grouped therein, gear teeth on said spider adjacent said articles, a second spider within the first spider having a plurality of articles symmetrically grouped therein, and gear teeth on the outer periphery of said inner spider, whereby reciprocation and rotation of said outer spider reciprocates and rotates said inner spider over approximately the same portions of said laps passed over by the articles in the outer group.

In testimony whereof, I hereunto affix my signature.

WILLIAM E. HOKE.